United States Patent
Roger et al.

(10) Patent No.: US 11,531,086 B2
(45) Date of Patent: Dec. 20, 2022

(54) DEVICE AND METHOD FOR PROCESSING RADAR SIGNALS

(71) Applicant: Infineon Technologies AG, Neubiberg (DE)

(72) Inventors: Andre Roger, Munich (DE); Markus Bichl, Feldkirchen-Westerham (DE); Romain Ygnace, Brunnthal (DE)

(73) Assignee: Infineon Technologies AG, Neubiberg (DE)

( * ) Notice: Subject to any disclaimer, the term of this patent is extended or adjusted under 35 U.S.C. 154(b) by 652 days.

(21) Appl. No.: 16/169,159

(22) Filed: Oct. 24, 2018

(65) Prior Publication Data
US 2019/0146058 A1 May 16, 2019

(30) Foreign Application Priority Data
Nov. 14, 2017 (DE) .................... 10 2017 126 723.9

(51) Int. Cl.
*G01S 7/35* (2006.01)
*G01S 7/02* (2006.01)
*G01S 7/288* (2006.01)
*G01S 13/26* (2006.01)
*G01S 13/931* (2020.01)

(52) U.S. Cl.
CPC .............. *G01S 7/356* (2021.05); *G01S 7/023* (2013.01); *G01S 7/288* (2013.01); *G01S 7/352* (2013.01); *G01S 13/26* (2013.01); *G01S 7/2883* (2021.05); *G01S 13/931* (2013.01)

(58) Field of Classification Search
CPC .......... G01S 7/288; G01S 7/023; G01S 7/352; G01S 13/26; G01S 13/931; G01S 2007/2883; G01S 2007/356

USPC ................................................. 342/175, 147
See application file for complete search history.

(56) References Cited

U.S. PATENT DOCUMENTS

| 10,852,409 B2 | 12/2020 | Nugraha et al. |
| 2009/0040103 A1 | 2/2009 | Chansarkar et al. |
| 2013/0242283 A1* | 9/2013 | Bailey ................... G01S 7/4813 356/4.01 |

(Continued)

FOREIGN PATENT DOCUMENTS

| JP | 2016188859 A | 11/2016 |
| JP | 2017520818 A | 7/2017 |

OTHER PUBLICATIONS

Wikipedia; "Constant False Alarm Rate"; https://en.wikipedia.org/wiki/Constant_false_alarm_rate; Sep. 4, 2017.

*Primary Examiner* — Bo Fan
(74) *Attorney, Agent, or Firm* — Eschweiler & Potashnik, LLC (57) ABSTRACT

A radar device is disclosed including an input DMA module, at least one processing module, and an output DMA module. The input DMA module is arranged to access a memory and supply data from the memory to the at least one processing module, wherein each of the processing modules is arranged to be enabled or disabled. The at least one processing module that is enabled is arranged to process at least a portion of the data supplied by the input DMA module, and the output DMA module is arranged to store the data that are processed by the at least one processing module that is enabled in the memory. Also, a method for processing data by a radar device is provided.

13 Claims, 8 Drawing Sheets

| | | Step 301 | Step 302 | Step 303 | Step 304 | Step 305 |
|---|---|---|---|---|---|---|
| 401 | Input DMA module | On (Data source = raw data) | ON (data source = FFT results) | On (data sources = FFT results and noise signal) | ON (data source = signal difference) | On (data sources = corrected signal) |
| 402 | Windowing module | OFF | OFF | OFF | OFF | ON |
| 403 | FFT/iFFT module | ON (FFT mode) | OFF | OFF | OFF | ON (iFFT mode) |
| 404 | Signal power module | OFF | ON | OFF | ON | OFF |
| 405 | Thresholding module | OFF | ON | OFF | ON | OFF |
| 406 | Bin rejection module | OFF | ON (zeroing mode) | OFF | ON (zeroing mode) | OFF |
| 407 | Formatter module | OFF | ON (multiply by "-1") | OFF | OFF | OFF |
| 408 | Vector adding module | OFF | OFF | ON | OFF | OFF |
| 409 | Output DMA module | ON (output of FFT module: write FFT results) | ON (output of thresholding module: write signal below threshold) | ON (output of vector adding module: write signal difference) | ON (output of thresholding module: write corrected signal) | ON (output of FFT module: write modified raw signal) |

(56) References Cited

U.S. PATENT DOCUMENTS

| | | |
|---|---|---|
| 2014/0115195 A1 | 4/2014 | Higham |
| 2014/0375491 A1 | 12/2014 | Roger |
| 2015/0324147 A1 | 11/2015 | Jain et al. |
| 2016/0282458 A1 | 9/2016 | Nugraha |
| 2017/0054449 A1* | 2/2017 | Mani ...................... H03M 7/40 |

* cited by examiner

| | | Step 301 | Step 302 | Step 303 | Step 304 | Step 305 |
|---|---|---|---|---|---|---|
| 401 | Input DMA module | On (Data source = raw data) | ON (data source = FFT results) | On (data sources = FFT results and noise signal) | ON (data source = signal difference) | On (data sources = corrected signal) |
| 402 | Windowing module | OFF | OFF | OFF | OFF | ON |
| 403 | FFT/iFFT module | ON (FFT mode) | OFF | OFF | OFF | ON (iFFT mode) |
| 404 | Signal power module | OFF | ON | OFF | ON | OFF |
| 405 | Thresholding module | OFF | ON (zeroing mode) | OFF | ON (zeroing mode) | OFF |
| 406 | Bin rejection module | OFF | ON (multiply by "-1") | OFF | OFF | OFF |
| 407 | Formatter module | OFF | OFF | OFF | OFF | OFF |
| 408 | Vector adding module | OFF | OFF | ON (output of vector adding module: write signal difference) | OFF | OFF |
| 409 | Output DMA module | ON (output of FFT module: write FFT results) | ON (output of thresholding module: write signal below threshold) | ON (output of vector adding module: write signal difference) | ON (output of thresholding module: write corrected signal) | ON (output of FFT module: write modified raw signal) |

DEVICE AND METHOD FOR PROCESSING RADAR SIGNALS

REFERENCE TO RELATED APPLICATIONS

This application claims priority to DE 10 2017 126 723.9 filed on Nov. 14, 2017, the contents of which are incorporated by reference in their entirety.

FIELD

Embodiments of the present disclosure relate to radar applications, in particular an efficient way to process radar signals obtained by at least one radar sensor, e.g., via at least one antenna. Processing radar signals in this regard in particular refers to radar signals received by a sensor or an antenna.

BACKGROUND

Several radar variants are used in cars for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e. a signal distributed across the frequency. The amplitude of the signal may indicate an amount of echo, wherein a peak may represent a target that needs to be detected and used for further processing, e.g., adjust the speed of the car based on another car travelling in front.

A radar processing device may provide different types of outputs, e.g., a command to a control unit, an object or an object list to be post-processed by at least one control unit, at least one FFT peak to be post-processed by at least one control unit. Utilizing FFT peaks enables high performance post processing.

Constant false alarm rejection (CFAR), also referred to as constant false alarm rate, is in particular known as a threshold method for FFT result analysis which may be based on a signal power. CFAR allows adapting a threshold to decide whether the FFT signal indicates a potential target. CFAR in particular considers background noise, clutter and interference. Several CFAR algorithms are known. For details, reference is made to http://en.wikipedia.org/wiki/Constant_false_alarm_rate.

CFAR may be used as one approach to select FFT peaks, e.g., by comparing such peaks with predefined thresholds.

SUMMARY

A first embodiment relates to a radar device comprising an input DMA module, at least one processing module, and an output DMA module. The input DMA module is arranged to access a memory and supply data from the memory to the at least one processing module. Each of the processing modules is arranged to be enabled or disabled, and the at least one processing module that is enabled is arranged to process at least a portion of the data supplied by the input DMA module. The output DMA module is arranged to store the data that are processed by the at least one processing module that is enabled in the memory.

A second embodiment relates to a method for processing data by a radar device, wherein the radar device comprises an input DMA module, at least one processing module, and an output DMA module. The method comprises accessing via the input DMA module a memory and supplying data from the memory to the at least one processing module, and enabling or disabling each of the processing modules. The method further comprises processing at least a portion of the data supplied by the input DMA module by the at least one processing module that is enabled, and storing via the output DMA module the data in the memory, which data are processed by the at least one processing module that is enabled.

A third embodiment relates to a computer program product directly loadable into a memory of a digital processing device, comprising software code portions for performing the steps of the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Examples described herein in particular refer to a hardware (HW) structure that in particular acts as a hardware accelerator for signal processing in radar systems. The signal processing may be conducted in the frequency and/or the time domain.

Radar applications have to deal with interference. This in particular applies to automotive radar applications. Such interference impacts the detection of objects by reducing the ability to differentiate between noise and an actual target. Objects that are not detected correctly may lead to wrong decisions, which may in particular be detrimental to autonomous driving applications of a vehicle.

Solutions described herein in particular enable the HW structure to perform operations directed to interference detection and mitigation. Such operations may be configurable, e.g., by a user, and hence be adjusted to a predefined use-case scenario.

Interference may stem from external electric devices: This type of interference may last longer than 1 chirp. Phase modulation techniques may be used to reduce the impact of this type of interference.

A chirp is a transmitted signal. The chirp may comprise a frequency up shift or a frequency down shift (ramp of frequencies). A "bin" may in particular be a result of a FFT processing. An input to an FFT stage may be either real data sampled via an analog-to-digital converter (ADC) or FFT bins from a previous FFT stage (when multiple FFT processing stages are required).

The bin or chirp may in particular refer to at least one sample, a frequency or a frequency range (e.g., a ramp of frequencies) that could be associated with a potential target (i.e. at least one potential target).

Also, there may be interference from external radar systems: This type of interference may be time-limited to a duration lasting less than 1 chirp. The external radar system may in particular be close to the actual radar signal and thus have a significant impact.

Figure 1:
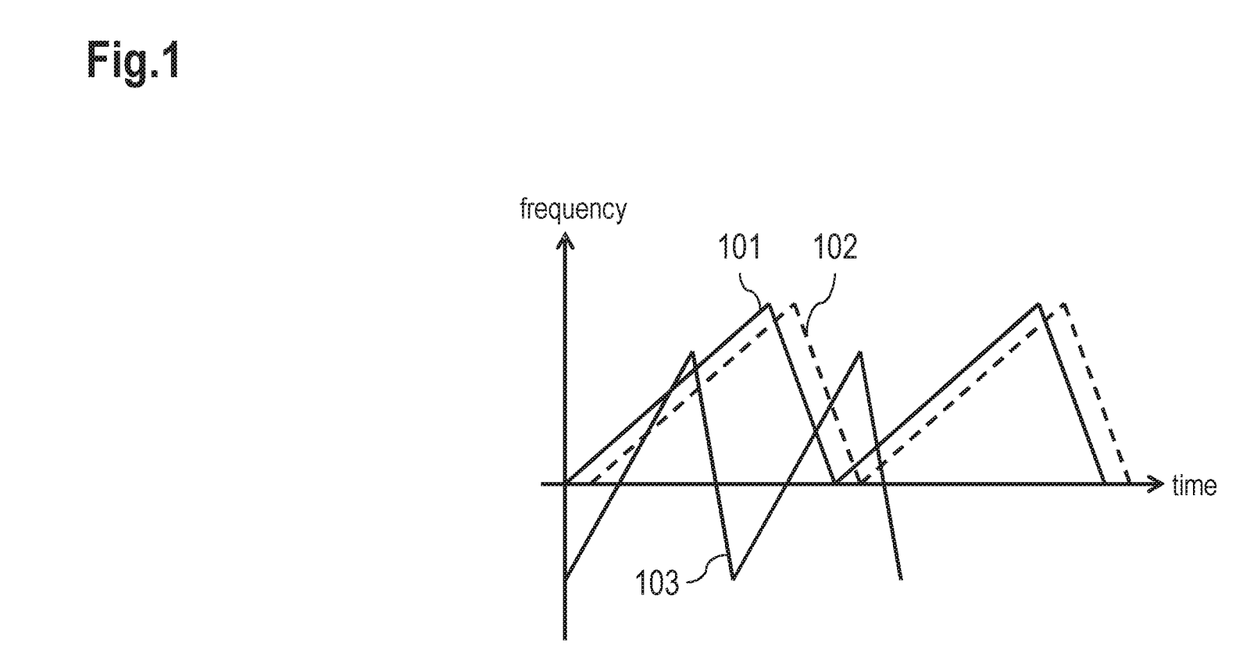
FIG. 1 shows an exemplary diagram comprising two interfering radar signals.

FIG. 1 shows an exemplary diagram comprising a radar signal 101 with two chirps (here: ramps) emitted by a transmitter of a radar system. A signal 102 is a reflection of the radar signal 101 as detected by a receiver of this radar system (without interference from another radar signal).

A signal 103 shows two chirps of another radar transmitter (of a different radar system) that may interfere with the radar signal 101.

This interfering radar signal 103 may contribute to the reflected radar signal 102 and hence deteriorate the overall performance of the radar system emitting the radar signal 101. Such deterioration may comprise an increase of noise level thereby concealing objects to be detected. For example, the interfering signal 103 may fall within an intermediate frequency (IF) of the signal 101, which may lead to (unwanted) peaks in the received overall signal.

There are known processing approaches to handle such interference: The signal received (comprising the interference of a reflected radar signal from a different transmitter) may be sampled (i.e. analog-to-digital converted) and the samples may be filtered in the time domain and/or the frequency domain.

Hence, known interference detection and mitigation approaches may be used by the examples described herein. Such approaches may use FFT and inverse FFT algorithms.

An exemplary solution provided herein in particular utilizes the HW structure (one piece of hardware or several pieces of hardware) comprising several configurable modules. Each module may have the capability to perform at least one of the following: a Fast Fourier Transform (FFT); an inverse FFT (iFFT); a windowing operation using a predefined (e.g., user-defined) coefficient table, e.g., combined with particularities for interference detection and/or mitigation; a comparison operation between a signal power and a reference power; a storing operation for storing the result in a memory, e.g., a register; and a selective zeroing operation of a signal, wherein the selective zeroing operation may be based on an input register.

In addition, a sequencing operation (provided, e.g., by a sequencer) is provided to load a configuration from a memory, wherein the configuration may comprise several acts or operations performed by a configured selection of the modules.

It is noted that the sequencing operation may use or bypass (i.e. select) distinct modules (and the operation(s) supplied by such modules). Also, the sequencing operation may iteratively use the several modules, e.g., until a termination condition is fulfilled.

Based on such sequencing operation, the modules may be utilized in a flexible manner, wherein each module may (repeatedly or once) conduct (at least) one of the operations described above.

Advantageously, the HW structure enables an efficient acceleration of operations to be executed on radar data (i.e. received and optionally pre-processed radar signals) to, e.g., reduce (cancel or mitigate) the detrimental impact of interference.

In an exemplary scenario, the following modules may be used: an FFT module, a signaling thresholding module conducting, e.g., CFAR and/or basic thresholding, and a windowing module capable of performing FFT and iFFT.

This allows conducting FFT operations, modifying signals in the frequency domain (i.e. filtering by removing peaks) and conducting iFFT operations to transform the modified signals back into the time domain. A subsequent act may be a multi-dimensional FFT processing.

Figure 2:
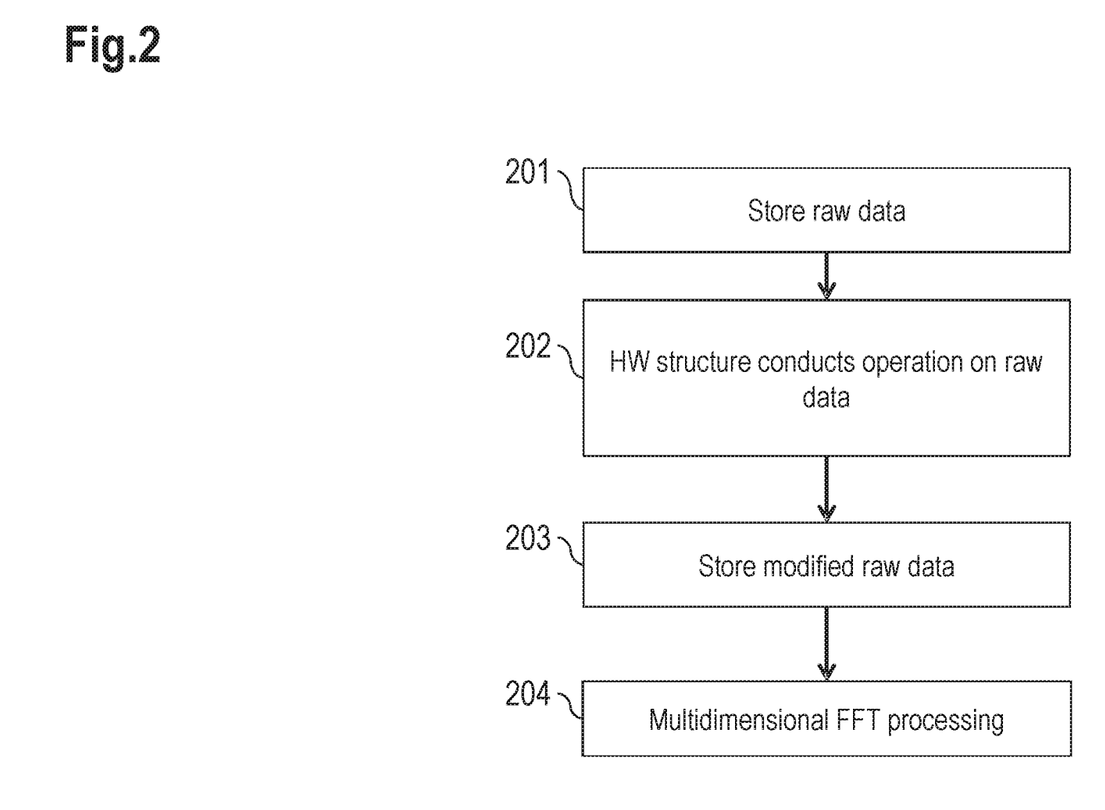
FIG. 2 shows an exemplary diagram comprising acts to be performed on digital radar signals.

FIG. 2 shows an exemplary diagram comprising steps to be performed on digital radar signals.

At 201, the raw radar data is stored in a memory.

In a next act 202, operations of the HW structure are performed on the stored raw data. In a subsequent act 203 the modified raw data is stored in the memory (or a different memory) and in a next act 204 multidimensional FFT processing is conducted. After that (not shown in FIG. 2), post-FFT processing may reveal, classify and confirm targets (objects).

Figure 3:
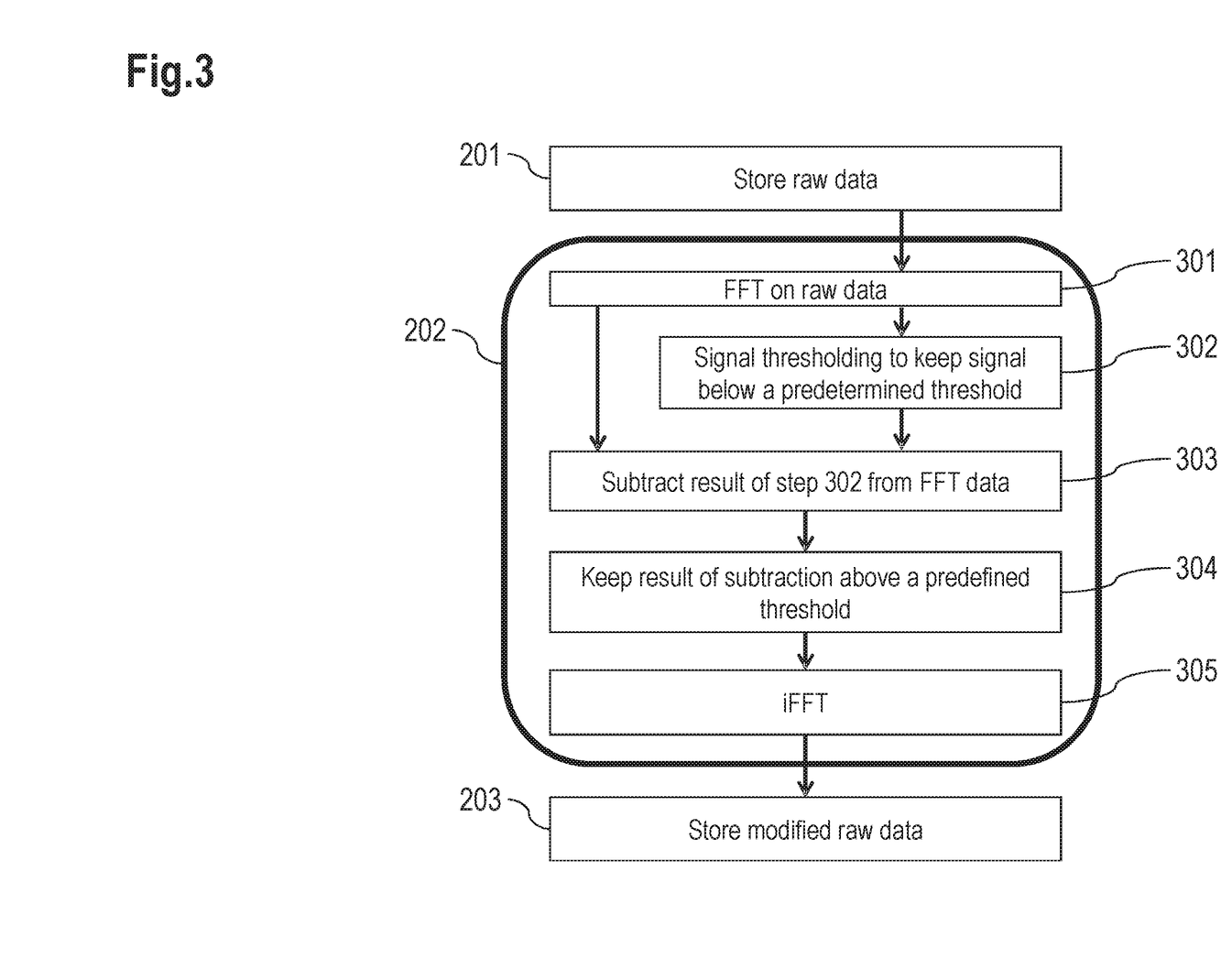
FIG. 3 shows an excerpt from FIG. 2, further illustrating the act of the HW structure conducting operations on the raw data.

FIG. 3 shows the act 202 of FIG. 2 in more detail.

At 301, a FFT is conducted on the raw data that were stored in the memory at 201. In a subsequent act 302, a signal thresholding is performed on the FFT data obtained at 301. This allows considering only FFT results that are below a threshold (i.e. to mask unwanted peaks).

At 303, the results of act 302 are subtracted from the FFT data obtained at 301 and at 304 a thresholding is performed on the results of act 303 to determine which of the results are above a predefined threshold. In a subsequent act 305, the results of act 304 are transformed via an iFFT and stored as modified raw data at 203.

Figure 4:
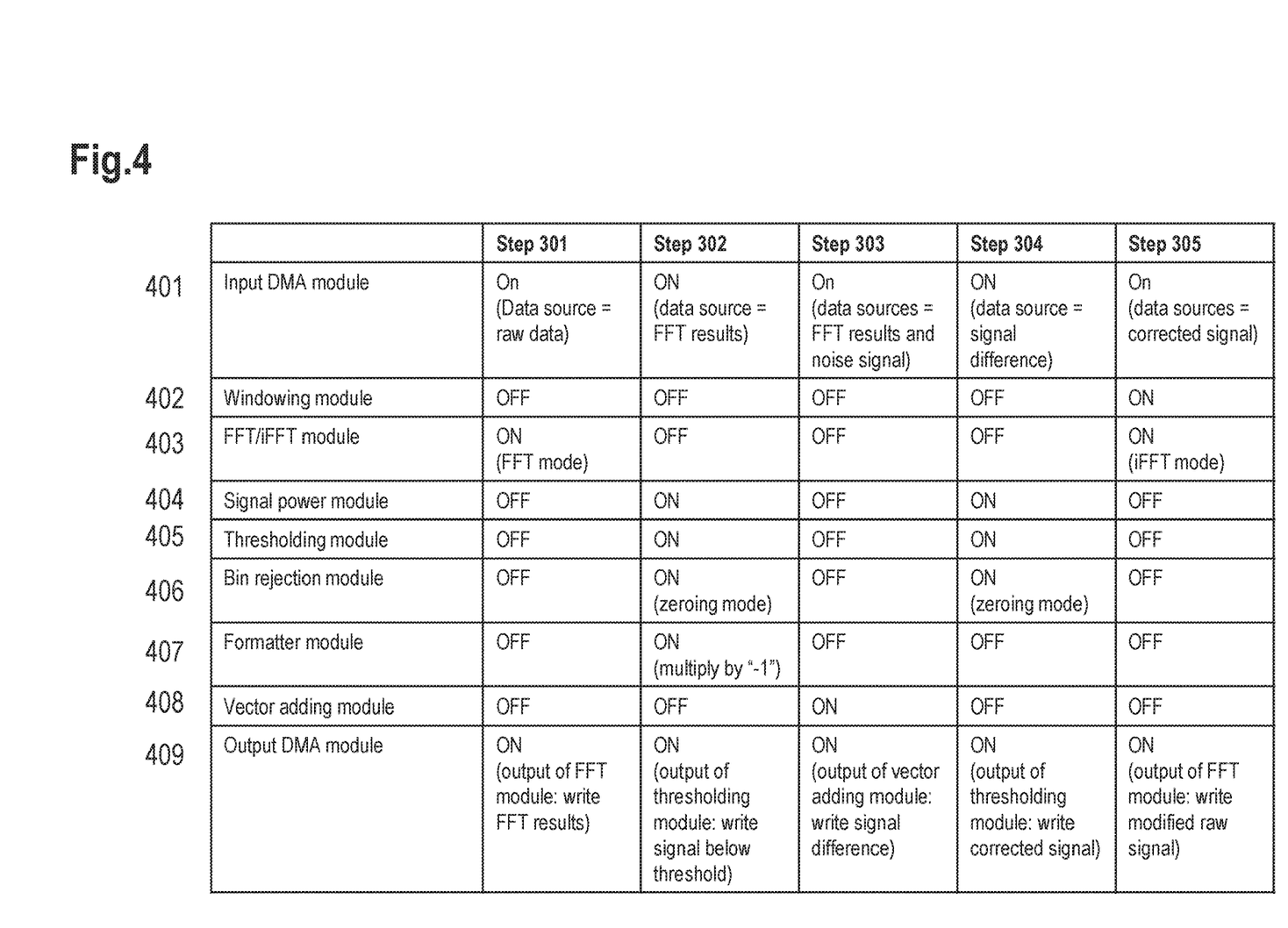
FIG. 4 shows an exemplary table comprising several modules and an information whether each of the modules is selected for any of the operations described in FIG. 3.

FIG. 4 shows an exemplary table comprising several modules comprising circuitry hardware or a combination of circuitry hardware and software and an information which of the modules are selected for any of the operations 301 to 305 described above. The modules are as follows:

An input DMA module 401: The input DMA module allows accessing the raw data stored in the memory via direct memory access (DMA).

A windowing module 402: The windowing module provides mathematics of a windowing function, which may in particular perform a real or complex multiplication between input operands and window coefficients.

An FFT/iFFT module 403: The FFT/iFFT module allows conducting either a FFT or an iFFT operation. It can be configured to perform the FFT or the iFFT.

A signal power module 404: The signal power module determines a (e.g., mathematical) representation of a signal power.

Thresholding module 405: The thresholding module is capable of performing a threshold operation (comparison) and providing a result of such threshold operation. It may conduct a CFAR operation and/or a basic thresholding operation.

A bin rejection module 406: The bin rejection module is capable of zeroing a selection of the data in a systematic way or based on the results of the comparison done by the thresholding module 405.

A formatter module 407: The formatter module is capable of conducting a predefined operation, e.g., a multiplication by −1.

A vector adding module 408: The vector adding module performs an addition operation of two vectors (comprising complex or real vector elements). For example components of real elements may be signal power of FFT results. Hence, a vector addition across multiple antennas after a second stage FFT allows computing a range Doppler map made of non-coherent integrations.

An output DMA module 409: The output DMA module allows writing results of computations to the memory via DMA.

It is noted that a module may be construed such that it covers more than one operation. The module may in particular be flexibly configurable to allow selecting one of several operations. For example, the operation of the formatter module 407 may be implemented in the windowing module 402.

The table shown in FIG. 4 hence defines the activities of the modules for the various acts 301 to 305 as follows:

Act 301: The input DMA module 401, the FFT/iFFT module 403 and the DMA output module 409 are active (ON). The remaining modules are inactive (OFF). The input DMA module 401 obtains the raw data. The FFT/iFFT module 403 is operative in the FFT mode and the output DMA module 409 writes FFT results in particular without using the windowing function prior to the FFT.

Act 302: The input DMA module 401, the signal power module 404, the thresholding module 405, the bin rejection module 406, the formatter module 407 and the output DMA module 409 are active (ON). The remaining modules are inactive (OFF). The input DMA module 401 obtains the FFT results. The signal power module 404 computes a power of the input signal, the thresholding module 405 compares the power level of the input signal with a predefined threshold. Then, the bin rejection module 406 sets power levels that exceed the threshold to 0. The formatter module 407 rescales the results obtained from the bin rejection module 406. The output DMA module 409 writes the scaled results to the memory.

Act 303: The input DMA module 401, the vector adding module 408 and the DMA output module 409 are active (ON). The remaining modules are inactive (OFF). The input DMA module 401 obtains the noise signal from act 302 and the FFT results from act 301. The vector adding module does the subtraction of the results of acts 302 and 301. The result of the subtraction is stored by the output DMA module 409.

Act 304: The input DMA module 401, the signal power module 404, the thresholding module 405, the bin rejection module 406 and the output DMA module 409 are active (ON). The remaining modules are inactive (OFF). Hence, the FFT bins with an amplitude exceeding a threshold are set to 0. This advantageously mitigates interference. The input DMA module 401 obtains the FFT results of act 304, the modules 404, 405 and 406 process the FFT results (see act 302 for a more detailed description regarding the modules 404, 405 and 406) and the output DMA module 409 writes a corrected signal.

Act 305: The input DMA module 401, the windowing module 402, the FFT/iFFT module 403 and the DMA output module 409 are active (ON). The remaining modules are inactive (OFF). The input DMA module 401 obtains the corrected signal from the act 304. The windowing module 402 provides a windowing for the iFFT operation, which is conducted by the FFT/iFFT module 403, which is operative in the iFFT mode. The output DMA module 409 writes the modified raw data.

Hence, the HW structure allows to flexibly enable or disable the modules mentioned above. A combination of active modules allows conducting a set of operations on radar data, in particular raw data. Such radar data may be stored in a memory, which can be flexibly accessed and selectively modified by the HW structure. Hence, selected portions of the memory can be updated (modified) in a time-efficient way.

It is another advantage that combinations of modules performing a predetermined task (comprising at least one operation) may be largely independent from an external processor working on the (modified) raw data. Hence, the processing load can be efficiently shifted towards the chain of modules suggested herewith.

Figure 5:
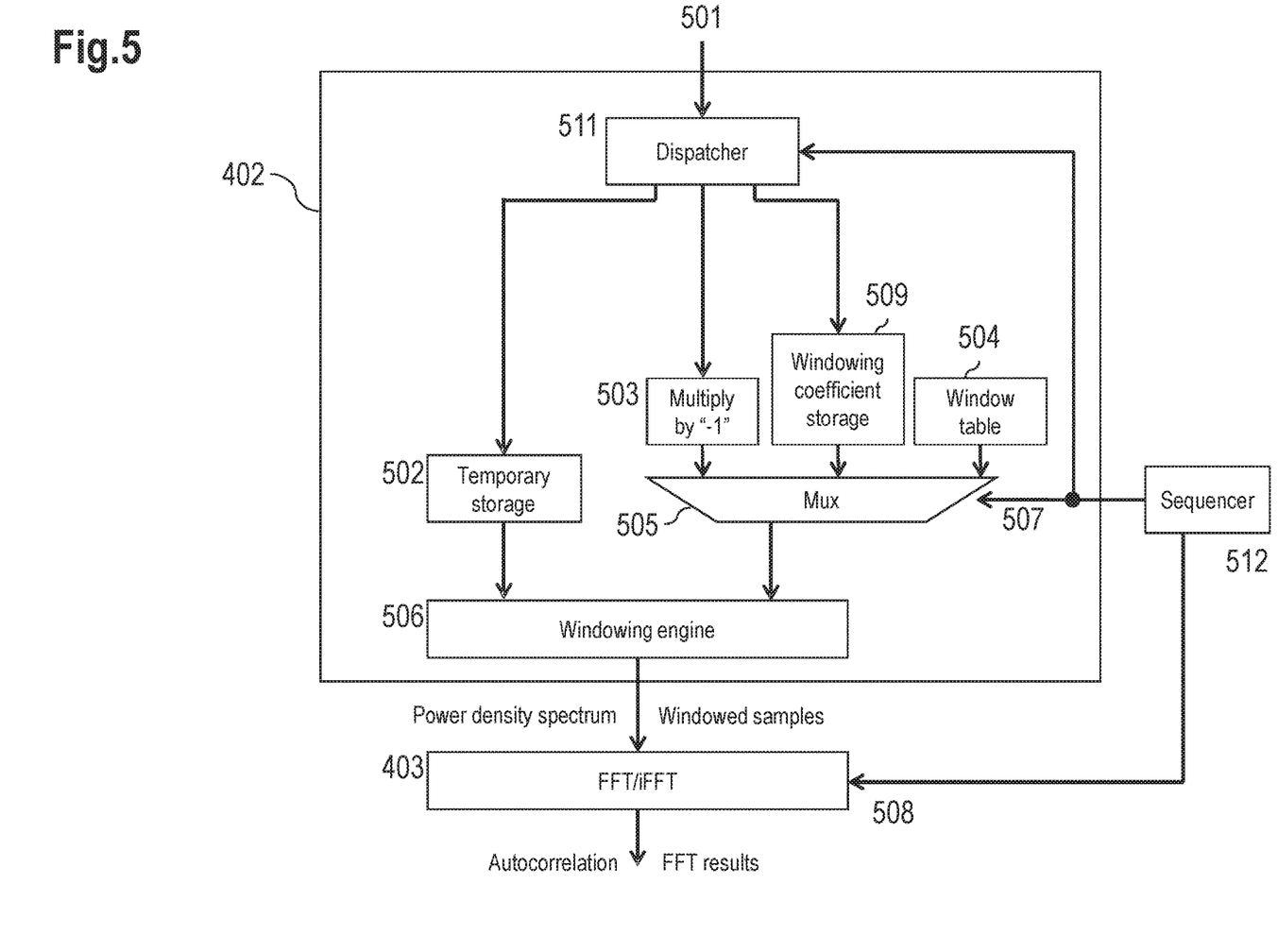
FIG. 5 shows an exemplary block diagram of the windowing module.

FIG. 5 shows the windowing module 402 in more detail. Data 501 from the memory may be accessed via the input DMA module 401 as described above and fed via a dispatcher circuit 511 to a temporary storage 502, a multiplier 503 and/or a windowing coefficient storage 509.

The multiplier circuit 503 conducts a multiplication by "−1" thereby making a real operand purely imaginary data. The window table 504 comprises a windowing table pointer increment and a windowing table, i.e. each time a new operand is read, the pointer is incremented and a window coefficient is read from the table using this new pointer.

The output of the multiplier circuit 503, the output of the windowing coefficient storage 509 and the output of the window table 504 is each connected to an input of a multiplexer circuit 505. The multiplexer 505, via a mode select signal 507, may thus supply at its output either the output of the multiplier 503, the output of the windowing coefficient storage 509 or the output of the window table 504.

The output of the multiplexer 505 and the temporary storage 502 each is connected to a windowing engine 506 that comprises circuitry hardware or a combination of circuitry hardware and software.

The windowing engine 506 conducts an operation on its inputs, in particular a scalar multiplication (of real parts and/or imaginary parts), and it may supply a power density spectrum (e.g., windowed samples) towards the FFT/iFFT module 403. Via a mode select signal 508 the FFT/iFFT module 403 can be operated either in the FFT mode or in the iFFT mode.

The mode select signal 507 is supplied by a sequencer circuit 512, which also supplies the mode select signal 508. The mode select signal 507 is also conveyed towards the dispatcher 511 to control the flow of the data 501 to any of the temporary storage 502, the multiplier 503 and/or the windowing coefficient storage 509.

The units 502 to 506, 509 and 511 are part of the windowing module 402, in one embodiment. The operations conducted by the windowing module 402 may be applied to all FFT bins or a selection of FFT bins.

Hence, depending on the mode selection signals 507 and 508, the windowing module 402 and the FFT/iFFT module 403 conduct one of the following operations:

- an FFT on windowed samples using windowing coefficients from a predefined table: the mode selection signal 508 selects that the FFT/iFFT module 403 operates in the FFT mode and the mode selection signal 507 selects the windowing coefficient from the window table 504;
- an FFT on precomputed windowing coefficients: the mode selection signal 508 selects that the FFT/iFFT module 403 operates in the FFT mode and the mode selection signal 507 selects the windowing coefficient storage 509 as input for windowing coefficients (based on the data 501); the windowing coefficients supplied by the windowing coefficient storage 509 may correspond to data 501 read on each even read access; in addition, the temporary storage 502 supplies data 501 read on each odd read access from the input DMA module 401;
- an autocorrelation of a signal: in this case, the mode selection signal 508 selects the FFT mode and the mode selection signal 507 selects window coefficients being supplied by the multiplier 503, which multiplies each sample by "−1"; these windowing coefficients correspond to data 501 read on each even read access from the input DMA module 401; in addition, the temporary storage 502 supplies data 501 read on each odd read access from the input DMA module 401; or
- an inverse FFT on windowed samples with window coefficients from the window table 504: the node selection signal 508 selects the iFFT mode and the mode selection signal 507 selects the window table 504 to become the output of the multiplexer 505.

The dispatcher 511 may in particular ensure that portions of the data 501 are fed to any of the temporary storage 502, the multiplier 503 and/or the windowing coefficient storage 509. Such selection may be directed to, e.g., even/odd data or any other deterministic or arbitrary selection.

The sequencer 512 controls the multiplexer 505, the FFT/iFFT module 403 and the dispatcher 511 via the mode select signals 507 and 508.

Figure 6:
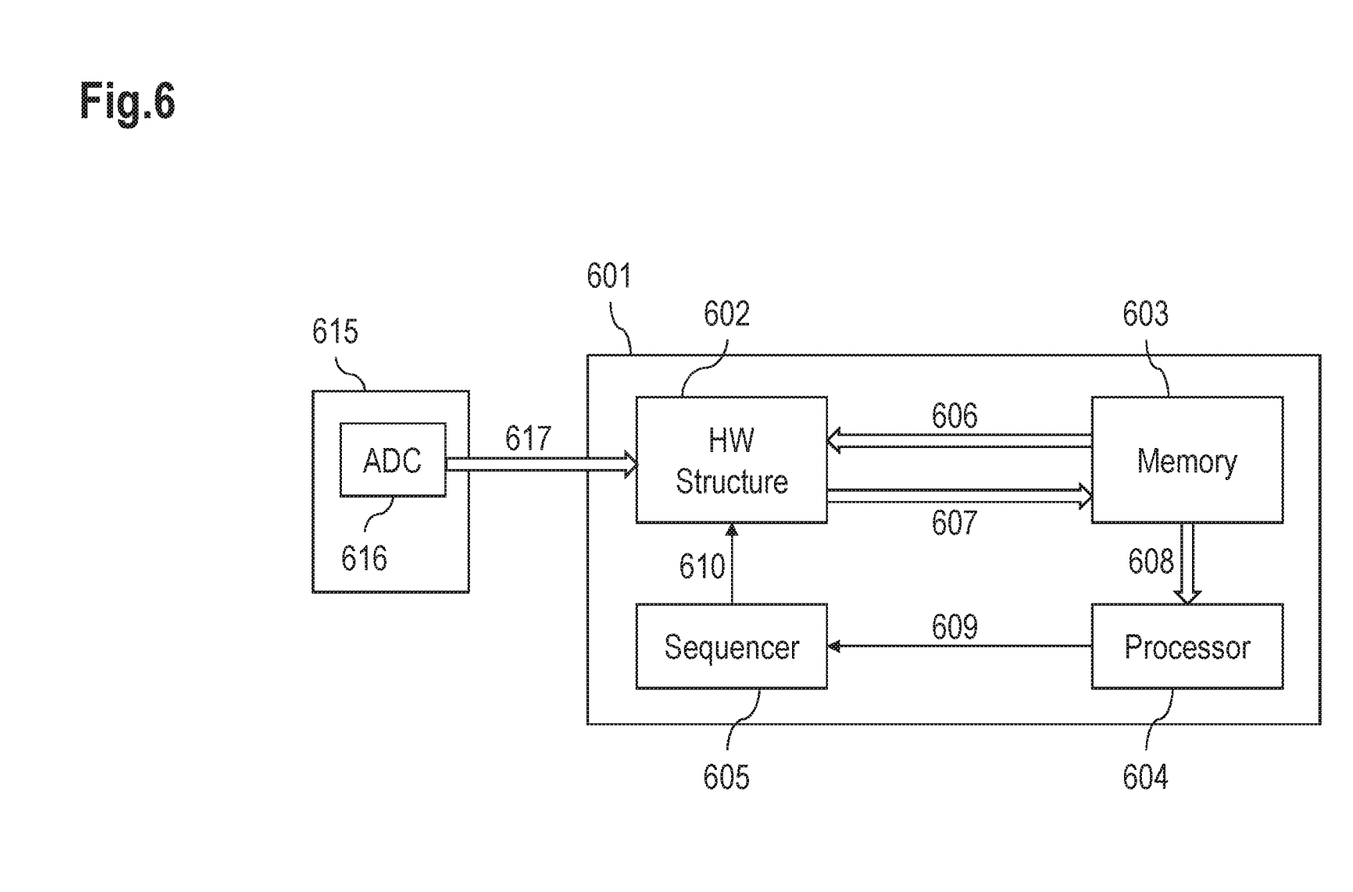
FIG. 6 shows a radar controller unit that is connected to a radio-frequency (RF) frontend, wherein the radar controller unit comprises the HW structure.

FIG. 6 shows a radar controller unit or circuit 601 that is connected to a radio-frequency (RF) frontend 615. The radar controller unit 601 comprises a HW structure 602, a (radar) memory 603, a processor circuitry 604 (or microcontroller) and a sequencer circuit 605. The HW structure 602 accesses the memory 603 (e.g. via DMA) to obtain data as indicated by an arrow 606. Also, the HW structure 602 may use several output paths (indicated by an arrow 607) to write (processed) data to the memory 603 (in particular to different locations of the memory 603). In addition, the RF frontend 615 comprises an analog-to-digital converter (ADC) 616 that supplies radar data to the HW structure (indicated by an arrow 617).

The processor circuitry 604 accesses data from the memory 603 (indicated by an arrow 608). Also, the processor sends configuration information 609 to the sequencer 605 and the sequencer hence configures via configuration information 610 the HW structure, i.e. determine which module of the HW structure 602 is activated and which is not activated.

It is an option that the processor 604 via the configuration information 609 supplies configuration linked lists that can be used by the sequencer 605 to set up the modules of the HW structure 602. Hence, the hardware structure as proposed is able to perform sequential computing acts without involving another processor.

The sequencer 605 may be realized as a piece of hardware that is writing configuration values (obtained via said configuration linked lists or directly from the processor 604) to configuration registers of the HW structure 602.

Also, the sequencer 605 may be arranged to update the configuration after a predetermined amount of time or based on a trigger, e.g., a next pre-processing stage to be conducted by the HW structure 602.

Figure 7:
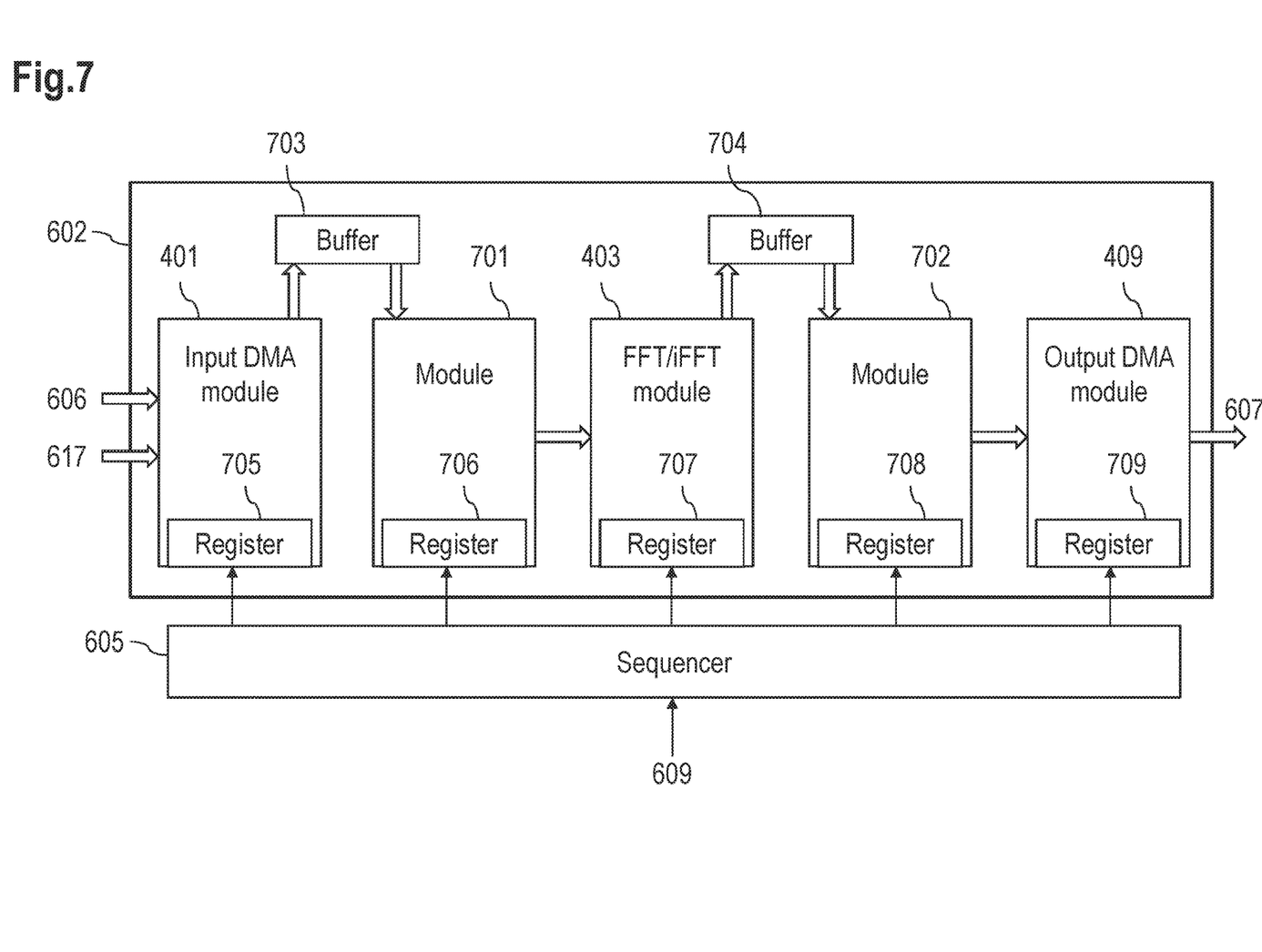
FIG. 7 shows an exemplary embodiment of the HW structure in more detail.

FIG. 7 shows the HW structure 602 in more detail according to one embodiment. In the example of FIG. 7, the HW structure comprises the input DMA module or circuit 401, the FFT/iFFT module or circuit 403, the output DMA module or circuit 409 and two additional modules/circuits 701 and 702. In particular, these modules 701 and 702 may be flexibly (de)selected; at least one of the modules 701, 702 may be bypassed. It is also an option to bypass the FFT/iFFT module 403.

The data 606 from the memory 603 and the data 617 from the RF frontend 615 are accessible by the input DMA module 401. After the input DMA module 401 the operations of the module 701 are executed. Next is the FFT/iFFT module 403. Subsequent to the FFT/iFFT module 403 is the module 702, which supplies processed data to the output DMA module 409. The output DMA module 409 writes data 607 to the memory 603.

The communication between the input DMA module 401 and the module 701 can be achieved via a buffer 703. Also, the communication between the FFT/iFFT module 403 and the module 702 can be achieved via a buffer 704.

Each of the modules 401, 701, 403, 702 and 409 comprises a register 705 to 709, which can be configured and/or updated by the sequencer 605. An update may be conducted once the last operand has been read from the memory 603 and has been processed by the modules of the HW structure 602. The modules (via the registers 705 to 709) may be configurable in particular to be bypassed. It is an option that at least the input DMA module 401 and the output DMA module 409 are not bypassed. It is another option that at least the input DMA module 401, the FFT/iFFT module 403 and the output DMA module 409 are no bypassed.

Hence, the HW structure 602 via its modules 701, 403, 702 allows to re-circulate and re-process data that has been previously written to the memory 603.

Figure 8:
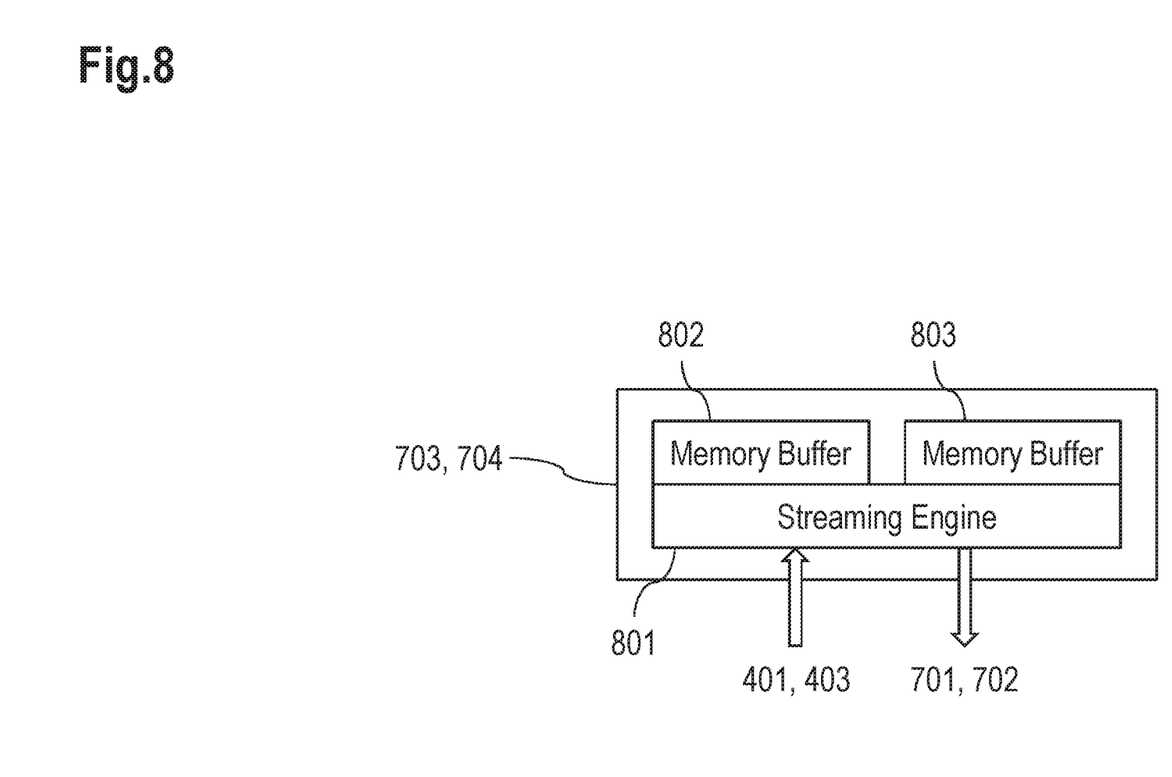
FIG. 8 shows the structure of each of the buffers that are arranged in the HW structure of FIG. 7.

FIG. 8 shows the structure of each of the buffers 703 and 704, according to one embodiment, comprising a streaming engine circuit 801, which is connected to two memory buffers 802 and 803: The streaming engine 801 hence allows writing to one of the memory buffers 802, 803 while reading from the respective other memory buffer 803, 802 (or vice versa).

Hence, the buffers 703, 704 may each enable a dual ping-pong buffer scheme. The streaming engine 801 of the buffer 703 allows the input DMA module 401 to efficiently pass a parameter or operand towards the module 701. Accordingly, the streaming engine of the buffer 704 allows the FFT/iFFT module 403 to efficiently provide a parameter or operand towards the module 702.

The dual memory buffers 802, 803 enable a ping-pong-buffering scheme, wherein one of the memory buffers is in a filling mode and one of the memory buffers is in an un-filling mode.

The streaming engine 801 may be configured by the sequencer 605. The streaming engine controls the memory buffers 802, 803 and ensures that the modules are supplied with data (i.e. "kept busy").

It is noted that the input DMA module 401 may be configured by the sequencer 605 as well. The input DMA module 401 may be flexibly configured to access the memory 603. This may be achieved by configuring a base address, an address increment, a loop increment and/or a loop count, e.g., per dimension of operands (range Doppler and antenna). Hence, the input DMA module 401 may, e.g., be configured to read operands from the memory 603 across a range, a Doppler dimension and/or an antenna dimension. The operands may in particular be read in the required dimension and/or sequence for the processing act. For example, an entire data cube or a portion of the data cube may be read. Such portion may comprise at least one slice of the data cube.

A radar data cube provides an intuitive way to represent radar processing as a function of space and time. The radar data cube may be perceived as a three-dimensional block with the radar returns of a single pulse represented along a first axis, returns from additional receiver elements along a second axis, and a collection of the returns from multiple pulses along a third axis (see, e.g., https://de.mathworks.com/company/newsletters/articles/building-and-processing-a-radar-data-cube.html, which is hereby incorporated by reference).

Each of the modules 701 and 702 may comprise several execution units, which may operate on the input data (signal) and/or a signal power of the input data. There may be execution units that are interlinked for performing complex operations like thresholding such that results of such thresholding may be conveyed to a bin rejection module. Also, the modules may have output FIFO buffers with DMA. The output FIFO buffers may have the same width as the memory, which is beneficial in particular when applying ECC access. The execution units of the modules 701, 702 may be arranged to provide serial and/or concurrent processing based on the output data supplied from the respective buffer 703, 704.

Hence, the solution presented in particular allows flexibly configuring the HW structure thereby enabling/disabling modules of the HW structure. The HW structure may then conduct complex (radar processing) operations by repeatedly using this HW structure in identical or different configurations. The data is processed by the HW structure via DMA access to a memory. Hence, data can be re-circulated through the HW structure, wherein the HW structure with each cycle may supply different operations and store the computed results in the memory.

An example of utilizing the HW structure in a flexible way is the operation "subtraction of two signals": Instead of having a vector subtraction module, the formatter module and the vector adding module can be used. The formatter module conducts a multiplication with "−1" and the vector adding module contributes an addition which in combination results in a subtraction. It is also an option that the windowing module is used, which may also provide the operation multiplication with "−1".

The examples suggested herein may in particular be based on at least one of the following solutions. In particular combinations of the following features could be utilized in order to reach a desired result. The features of the method could be combined with any feature(s) of the device, apparatus or system or vice versa.

A radar device is suggested, said radar device comprising an input DMA module, at least one processing module, and an output DMA module. The input DMA module is arranged to access a memory and supply data from the memory to the at least one processing module, and each of the processing modules is arranged to be enabled or disabled. The at least one processing module that is enabled is arranged to process at least a portion of the data supplied by the input DMA module, and the output DMA module is arranged to store the data that are processed by the at least one processing module that is enabled in the memory.

This radar device is also referred to as HW (hardware) structure.

Operands for the active processing modules can be obtained via the input DMA module and the output DMA module.

Hence, the radar device suggested herein allows using configurable hardware in a flexible way.

In an embodiment, at least one of the processing modules is an FFT module.

In an embodiment, at least one of the processing modules is an FFT/iFFT module, which can be operative in an FFT mode or in an iFFT mode.

Hence, complex signal manipulation may be achieved by using the FFT/iFFT module so that the radar device can be used for high performance interference detection and mitigation purposes.

In an embodiment, the input DMA module, the at least one processing module and the output DMA module are configurable by a sequencer.

In an embodiment, at least one of the processing modules is enabled by the sequencer.

In an embodiment, each of the input DMA module, the at least one processing module and the output DMA module comprise a register that is configurable by the sequencer.

In an embodiment, the sequencer is arranged to obtain at least one configuration list from a processing unit or from the memory, wherein the at least one configuration list contains configuration data for configuring the input DMA module, the at least one processing module and the output DMA module.

Hence, the sequencer may utilize the configuration list to configure the modules of the HW structure for a given computation stage and use a subsequent configuration for a subsequent computation stage (using the same HW structure) until the configuration of the configuration list is processed.

Hence, the circular processing provided by the radar device, which at each processing stage may be configured differently pursuant to the entries of the configuration list, is an efficient operation-based approach, executing one computation stage after another thereby using the memory as an intermediate storage. Advantageously, no tool chain to generate program code (assembler, linker, compiler) is required, as the modules of the HW structure can be flexibly configured to execute predefined operations.

This approach thus allows conducting of complex operations on at least one set of radar data (e.g., a vector). The vector may correspond, e.g., to a bin of a ramp of data samples, in particular to analog-to-digital converted samples or results of FFT processing.

In an embodiment, the output DMA module is arranged to write data in a native format to the memory.

It is in particular an option that the output DMA module uses the native format of an ECC (Error Correction Code). This is beneficial for the overall performance with regard to read/modify/write operations. The native format can be achieve by using a FIFO buffer that is filled until the full bus-width of an operation is reached. Hence, the operation predominately conducts full read/modify/write accesses instead of using, e.g., a read-operation directed to 32 bits for obtaining only 3 bits.

It is an option to concurrently generate multiple types of results by having multiple output DMA units with independent FIFO buffers.

In an embodiment, the output DMA module is arranged to write to different regions of the memory.

For example, the output DMA module may comprise several DMA engines to write data to different regions of the memory.

In an embodiment, each of the at least one processing modules are arranged in series between the input DMA module and the output DMA module.

In an embodiment, each of the at least one processing modules provides at least one of the following operations: a CFAR computation, at least one FFT computation, at least one iFFT computation, a windowing operation, an arithmetic operation, e.g., adding, subtracting, multiplying, etc., a comparison operation, a (selective) zeroing operation, an angular computation, in particular computing an angle and/or an elevation information, a peak computation, a coherent integration, a non-coherent integration, an interference mitigation computation, computing a range information, or computing a Doppler information, computing an energy information.

Further, a method for processing data by a radar device is suggested, wherein the radar device comprises an input DMA module, at least one processing module, and an output DMA module. The method comprises accessing via the input DMA module a memory and supplying data from the memory to the at least one processing module, enabling or disabling each of the processing modules. The method further comprises processing at least a portion of the data supplied by the input DMA module by the at least one processing module that is enabled, and storing via the output DMA module the data in the memory, which data are processed by the at least one processing module that is enabled.

The features described with regard to the radar device above may be applicable for the method processing the radar device as well.

A computer program product is provided, which is directly loadable into a memory of a digital processing device, comprising software code portions for performing the steps of the method as described herein.

In one or more examples, the functions described herein by units or modules may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. The term "exemplary" as used herein is intended to refer to an example rather than to infer a preferred option.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A radar device, comprising:
an input DMA module implemented at least partially in hardware,
at least one processing module implemented at least partially in hardware, and
an output DMA module implemented at least partially in hardware,
wherein the input DMA module is configured to access a memory and supply data from the memory to the at least one processing module,
wherein each of the processing modules is configured to be selectively enabled or disabled,
wherein the at least one processing module that is enabled is configured to process at least a portion of the data supplied by the input DMA module, and
wherein the output DMA module is configured to store the data, that are processed by the at least one processing module that is enabled, in the memory.

2. The radar device according to claim 1, wherein at least one of the processing modules is an FFT module.

3. The radar device according to claim 1, wherein at least one of the processing modules is an FFT/iFFT module, which is configured to selectively operate in an FFT mode or in an iFFT mode.

4. The radar device according to claim 1, wherein the input DMA module, the at least one processing module and the output DMA module are configurable by a sequencer.

5. The radar device according to claim 4, wherein at least one of the processing modules is enabled by the sequencer.

6. The radar device according to claim 3, wherein each of the input DMA module, the at least one processing module and the output DMA module comprise a register that is configurable by the sequencer.

7. The radar device according to claim 3, wherein the sequencer is configured to obtain at least one configuration list from a processing unit or from the memory, wherein the at least one configuration list contains configuration data for configuring the input DMA module, the at least one processing module and the output DMA module.

8. The radar device according to claim 1, wherein the output DMA module is arranged to write data in a native format to the memory.

9. The radar device according to claim 1, wherein the output DMA module is arranged to write to different regions of the memory.

10. The radar device according to claim 1, wherein each of the at least one processing modules are arranged in series between the input DMA module and the output DMA module.

11. The radar device according to claim 1, wherein each of the at least one processing modules provides at least one of the following operations:
a CFAR computation,
at least one FFT computation,
at least one iFFT computation,
a windowing operation,
an arithmetic operation comprising one or more of adding, subtracting, and multiplying,
a comparison operation,
a selective zeroing operation,
an angular computation comprising computing an angle or an elevation information, or both,
a peak computation,
a coherent integration,
a non-coherent integration,
an interference mitigation computation,
computing a range information,
computing a Doppler information, or
computing an energy information.

12. A method for processing data by a radar device, wherein the radar device comprises an input DMA module implemented at least partially in hardware, at least one processing module implemented at least partially in hardware, and an output DMA module implemented at least partially in hardware, the method comprising:
accessing via the input DMA module a memory and supplying data from the memory to the at least one processing module,
enabling or disabling each of the processing modules,
processing at least a portion of the data supplied by the input DMA module by the at least one processing module that is enabled, and
storing via the output DMA module the data in the memory, which data are processed by the at least one processing module that is enabled.

13. A non-transitory computer program product directly loadable into a memory of a digital processing device, comprising software code portions for processing data by a radar device, wherein the radar device comprises an input DMA module implemented at least partially in hardware, at least one processing module implemented at least partially in hardware, and an output DMA module implemented at least partially in hardware, wherein upon execution of the software code portions is configured to perform a method, the method comprising:
accessing via the input DMA module the memory or another memory and supplying data from the memory or the another memory to the at least one processing module,
enabling or disabling each of the processing modules,
processing at least a portion of the data supplied by the input DMA module by the at least one processing module that is enabled, and
storing via the output DMA module the data in the memory or another memory, which data are processed by the at least one processing module that is enabled.

* * * * *